UNITED STATES PATENT OFFICE.

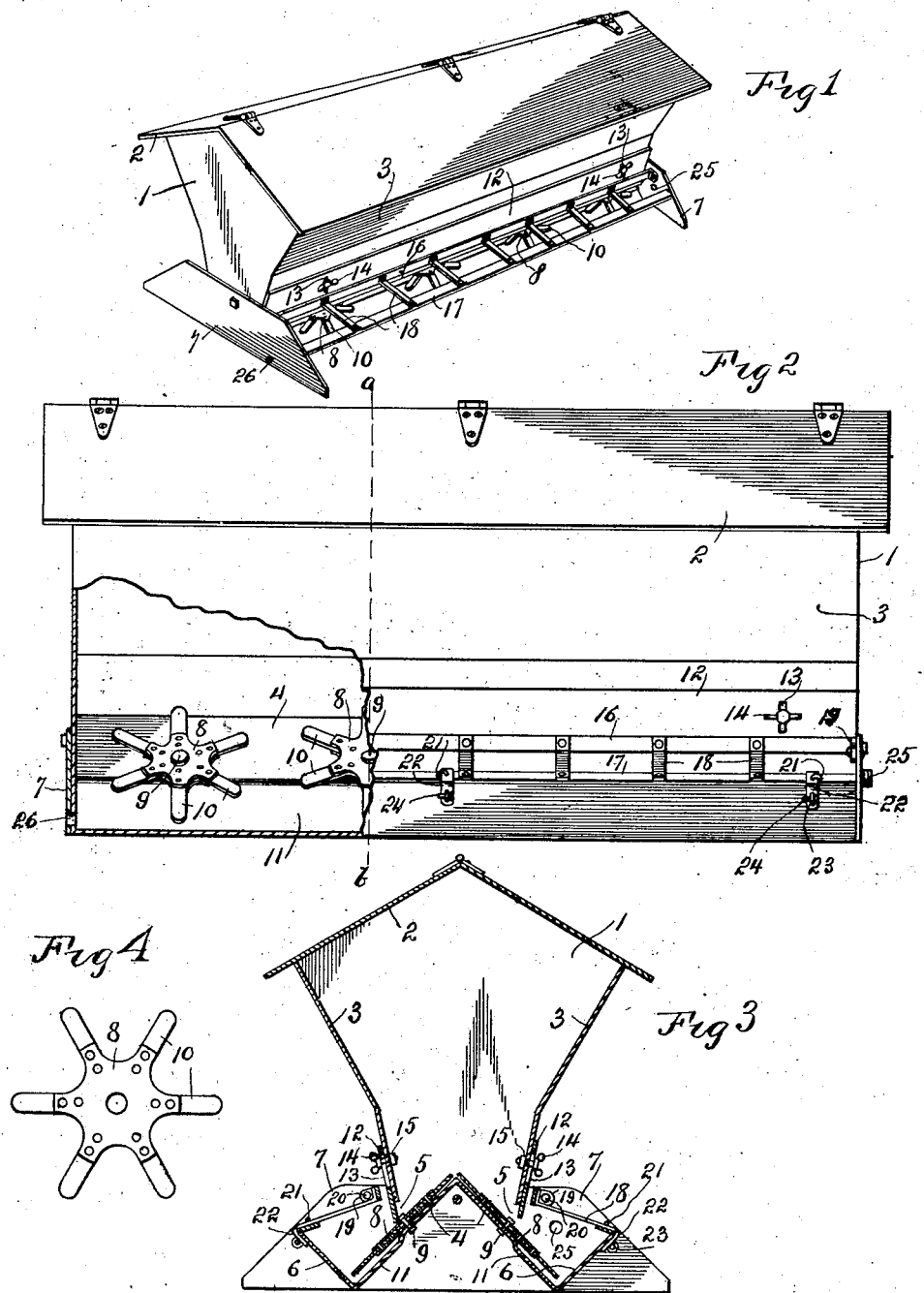

STERLING P. NEWMAN, OF EDGERTON, MISSOURI.

FEED-TROUGH.

979,026.     Specification of Letters Patent.     Patented Dec. 20, 1910.

Application filed August 2, 1909. Serial No. 510,714.

*To all whom it may concern:*

Be it known that I, STERLING P. NEWMAN, a citizen of the United States, residing at Edgerton, in the county of Platt and State of Missouri, have invented certain new and useful Improvements in Feed-Troughs, of which the following is a specification.

My invention relates to improvements in feed troughs.

The object of my invention is to provide a feed trough, which is simple in construction, cheap to manufacture, and in which the feed will be distributed to different animals with uniformity.

The novel features of my invention are hereinafter fully described and claimed.

In the accompanying drawings illustrative of my invention, Figure 1 is a perspective view, Fig. 2 is a side elevation, partly broken away. Fig. 3 is a section on the dotted line *a—b* of Fig. 2. Fig. 4 is a plan view of one of the stirring devices.

Similar reference characters denote similar parts.

1 denotes the feed receptacle, the upper end of which is provided with a hinged cover 2 and having sides 3, which preferably incline downwardly and inwardly. The bottom of the receptacle is provided preferably with two portions 4, which incline downwardly and outwardly from the middle of the receptacle in opposite directions and under the opposite sides 3. The sides 3 are provided, above the bottom 4, with longitudinal discharge openings 5, through which the food passes from said receptacle into two trough-shaped portions 6, of the bottom, which are disposed outside of the side walls 3. Two vertical end plates 7 serve as supports for the receptacle 1, to opposite ends of which said plates are secured, and also serve to close the trough-shaped portions 6 of the bottom. Two sets of rotary stirring devices 8, are pivoted by bolts 9 to the upper sides of the inclined portions 4 of the bottom respectively. The bolts 9 are preferably located within the receptacle 1. The stirring devices 8 extend through the openings 5 into the trough-shaped portions 6, and into said receptacle. Preferably each stirring device 8 has radial fingers 10 adapted to be engaged by the nose of an animal for rotating the device to stir and break up the food and assist in passing it through the openings 5 into the trough-shaped portions 6. The inclined portions 4, outside the walls 3, are preferably depressed below the planes of the portions within the receptacle. The depressed portions are denoted by 11 and are disposed below the stirring devices 8. Between the depressed portions 11 and the stirring devices 8 are spaces, the object of which is to prevent the freezing of the stirring devices to the bottom of the receptacle in cold weather, due to moisture in the breath of animals which feed at the trough. Within the receptacle the devices 8 may lie close to the bottom 4, as shown in Fig. 3, as at these points the moisture will not affect the operation of the stirring devices, and it is desirable to have them operate closely to the bottom of the receptacle, within said receptacle.

Regulatable means are provided for controlling the passage of food through each opening 5. For such purpose I prefer to employ two longitudinal plates 12, disposed respectively against the outer sides of the walls 3, each plate being provided with transverse slots 13 through which extend thumb screws 14, disposed in openings provided therefor in the side walls 3 and at their inner screw threaded ends having mounted thereon nuts 15, by which the plates 12 are tightly clamped in the positions to which they may be adjusted. The plates 12 are arranged so as to be moved upward or downward so as to cover more or less the openings 5.

Spacing devices are provided to separate the animals feeding at the trough. Each spacing device consists preferably of two longitudinal bars 16 and 17, to which are secured transverse bars 18, between which are spaces adapted to receive each the nose of an animal. Each bar 16 at opposite ends is provided with ears 19, which are pivoted by means of pins 20, to the adjacent end plates 7. Each bar 17 is provided with one or more staples 21, to which are connected respectively hasps 22, having openings adapted to receive staples 23, secured to the trough portions 6 of the bottom. Pins 24 may be inserted through the staples 23 to secure in a locked position the hasps 22.

When animals feed at the trough they insert their noses between the bars 18, into the trough-shaped portions 6, to get the food held in such trough-shaped portions. In moving their heads about their noses strike the fingers 10, thereby causing the devices 8 to rotate so as to stir the food within the receptacle 1 and cause it to feed through the openings 5. In one of the end plates 7 is preferably provided an inlet 25, through which water may be passed into the trough shaped portion at one side of the receptacle 1. The opposite end plate 7 is also provided with a drainage hole 26, which may be normally closed by a stopper, not shown. This hole is disposed adjacent to the bottom of the trough-shaped portion, which is provided with the water inlet 25.

Modifications of my invention, within the scope of the appended claim, may be made without departing from its spirit.

Having thus described my invention, what I claim and desire to secure by Letters Patent, is:—

In a feed trough, the combination with a feed receptacle having a bottom inclining downwardly and outwardly under one side of said receptacle, said side having a discharge opening above said inclined bottom, said bottom outside of said receptacle having a portion depressed below the plane of the portion which is within the receptacle, of a stirring device pivoted to the upper side of the bottom within the receptacle and having radial fingers extending through said opening and disposed above and separated from said depressed portion of the bottom.

In testimony whereof I have signed my name to this specification in presence of two subscribing witnesses.

STERLING P. NEWMAN.

Witnesses:
  E. B. House,
  Warren D. House.